United States Patent [19]
Williams et al.

[11] Patent Number: 5,510,993
[45] Date of Patent: Apr. 23, 1996

[54] MATERIAL PROCESSING SYSTEM

[75] Inventors: Anthony M. Williams, Iver; Jonathan Mortimer, Malvern; Samuel G. Schiro, Wotton-under-Edge, all of Great Britain

[73] Assignee: Manufacturing Joint Ventures International Limited, Great Britain

[21] Appl. No.: 315,188

[22] Filed: Sep. 29, 1994

Related U.S. Application Data

[63] Continuation of Ser. No. 778,170, May 20, 1992, abandoned.

[30]   Foreign Application Priority Data

Jun. 28, 1989 [GB] United Kingdom ............ 8914796

[51] Int. Cl.⁶ .................... G06F 19/00; G06B 19/418
[52] U.S. Cl. ............... 364/468; 364/474.11; 395/83; 395/901; 901/8
[58] Field of Search ...................... 364/468, 478, 364/401–403, 131–136, 474.11, 138, 139; 395/80, 83, 901; 483/901; 901/6–8, 30

[56]         References Cited

U.S. PATENT DOCUMENTS

| | | | |
|---|---|---|---|
| 4,578,764 | 3/1986 | Hutchins | 364/131 X |
| 4,633,385 | 12/1986 | Murata et al. | 395/83 X |
| 4,679,297 | 7/1987 | Hansen, Jr. et al. | 483/901 X |
| 4,870,592 | 9/1989 | Lampi et al. | 364/478 X |
| 4,891,765 | 1/1990 | Hatori | 364/474.11 X |
| 4,996,753 | 3/1991 | Jones | 483/901 X |
| 4,998,206 | 3/1991 | Jones et al. | 364/468 |

FOREIGN PATENT DOCUMENTS

| | | |
|---|---|---|
| 3416227 | 11/1984 | Germany . |
| 3420355 | 12/1984 | Germany . |
| 3621863 | 1/1987 | Germany . |
| 8803080 | 5/1988 | WIPO . |

OTHER PUBLICATIONS

Microsystem Design—"Transputers in Control"—pp. 14–15, Jan. 1989.

May et al—"Control and Communications for Multiple Cooperating Robots", Robotics and Computer Integrated Manufacturing, vol. 6, No. 1, 1989; pp. 37–53.

Coper et al—"The Supervision and Management of a Two Robots Flexible Assembly Cell"—1989 IEEE Int'l Conf. on Robotics and Automation; May 15, 1989; pp. 540–550.

Meier et al—"Rommunikationssystem zur Vernetzung von Robot Ersteuerungen"—Zwf Zeitschrift fur Wirtschafliche Fertigung; vol. 84, No. 1; 1989, pp. 34–37.

Primary Examiner—Joseph Ruggiero
Attorney, Agent, or Firm—Laff, Whitesel, Conte & Saret, Ltd.

[57]             ABSTRACT

A material processing cell comprises two controlled units (106, 110). The first is a main manipulator having an exchangeable end effector, for carrying out a wide range of operations. The second controlled unit is a power operations manipulator, having an exchangeable end effector for carrying out a range of operations requiring the application of high forces. Each of the controlled units includes a dedicated unit control device including a processor. Each unit control device is in communication with a system controller (122, 123), thus allowing the controlled units to carry out their operations simultaneously.

6 Claims, 3 Drawing Sheets

MATERIAL PROCESSING SYSTEM

This application is a continuation of application Ser. No. 07/778,170, filed 20 May 1992 now abandoned.

This invention relates to a material processing system such as an assembly cell.

The use of robots is increasingly common in a variety of manufacturing processes. One example of the use of such robots is in an assembly cell, which is provided on a factory production line to perform the automatic assembly of a product or a range of variants of such a product. Depending upon the required sophistication of the system, the robot control system may be of one of several different general sorts.

A conventional material processing system may include a robot, a control system and a collection of peripheral hardware. The control system may include a robot controller and a programmable logic controller with communication ability connected to the robot controller and provided to control the supplementary hardware.

Other known assembly systems include a number of robots, each for carrying out specific tasks in the assembly operation.

The present invention seeks to provide a material processing system including a control system which gives greater flexibility for the materials processing system to which it is applied. For example, where the material processing system is an assembly cell, the invention seeks to provide a system which can be controlled in such a way as to allow the totally automatic assembly of a family of products within a given range, with the specific product which is to be assembled being selectable by an operator of the system as and when required. Moreover, the system should be able, having been reconfigured with some manual intervention, to perform the same functions with a completely different product range.

According to the present invention, there is provided a material processing cell comprising:
 a system controller;
 a first controlled unit, having an exchangeable end effector for carrying out a first type of material processing function;
 a second controlled unit, having an exchangeable end effector for carrying out a second type of material processing function; and
 a sensor system, for supplying to the system controller position data concerning at least one object to be processed;
 wherein each of the first and second controlled units includes a respective dedicated unit control device comprising a respective processor, each dedicated unit control device being in communication with the system controller to receive command signals, such that the first and second controlled units may be enabled to carry out their respective material processing functions simultaneously.

For a better understanding of the present invention, and to show how it may be brought into effect, reference will now be made, by way of example, to the accompanying drawings in which:

FIGS. 1(a), 1(b) and 1(c) are schematic representations of conventional control systems;

Figure 1A:
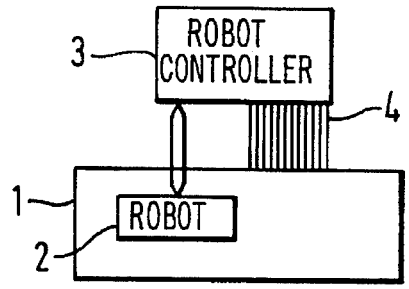
Figure 1:
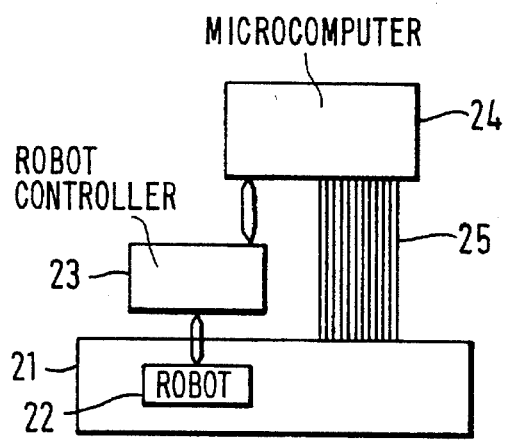

The system illustrated in FIG. 1(a) is typical of the control system used with many simple stand-alone robot systems. The robot system 1 includes a robot 2 and a collection of peripheral hardware. A robot controller 3 not only drives the robot arm but also, via the usually simple I/O facilities 4, controls the peripheral hardware.

FIG. 1(b) illustrates a system in which the I/O capability is extended. The robot system 21 includes a robot 22 which is driven by a robot controller 23. However, in this case, a microcomputer 24 controls the supplementary hardware via the I/O lines 25.

Figure 1C:
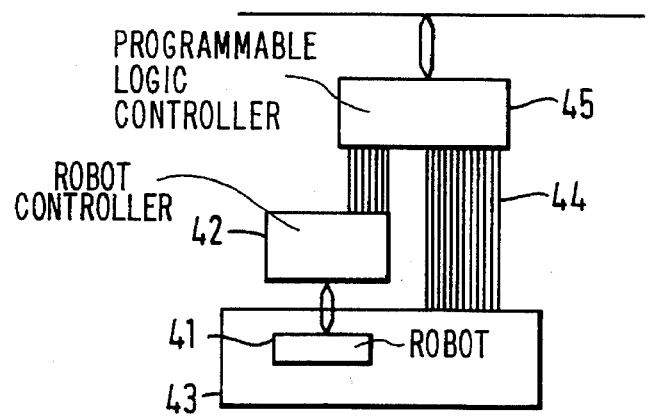

However, even the system shown in FIG. 1(b) can result in too much of the time of the controller's central processing unit being taken up with the control of the supplementary hardware, as the complexity of the system increases. Thus, FIG. 1(c) shows a system in which some of this processing load is relieved. In this system, the robot 41 is driven by a robot controller 42, while the peripheral hardware of the robot 43 is driven via I/O lines 44 by a programmable logic controller 45, which also controls the robot controller. The programmable logic controller has communications ability, and thus this system also provides the power which is required to develop simple error recovery strategies.

Figure 2:
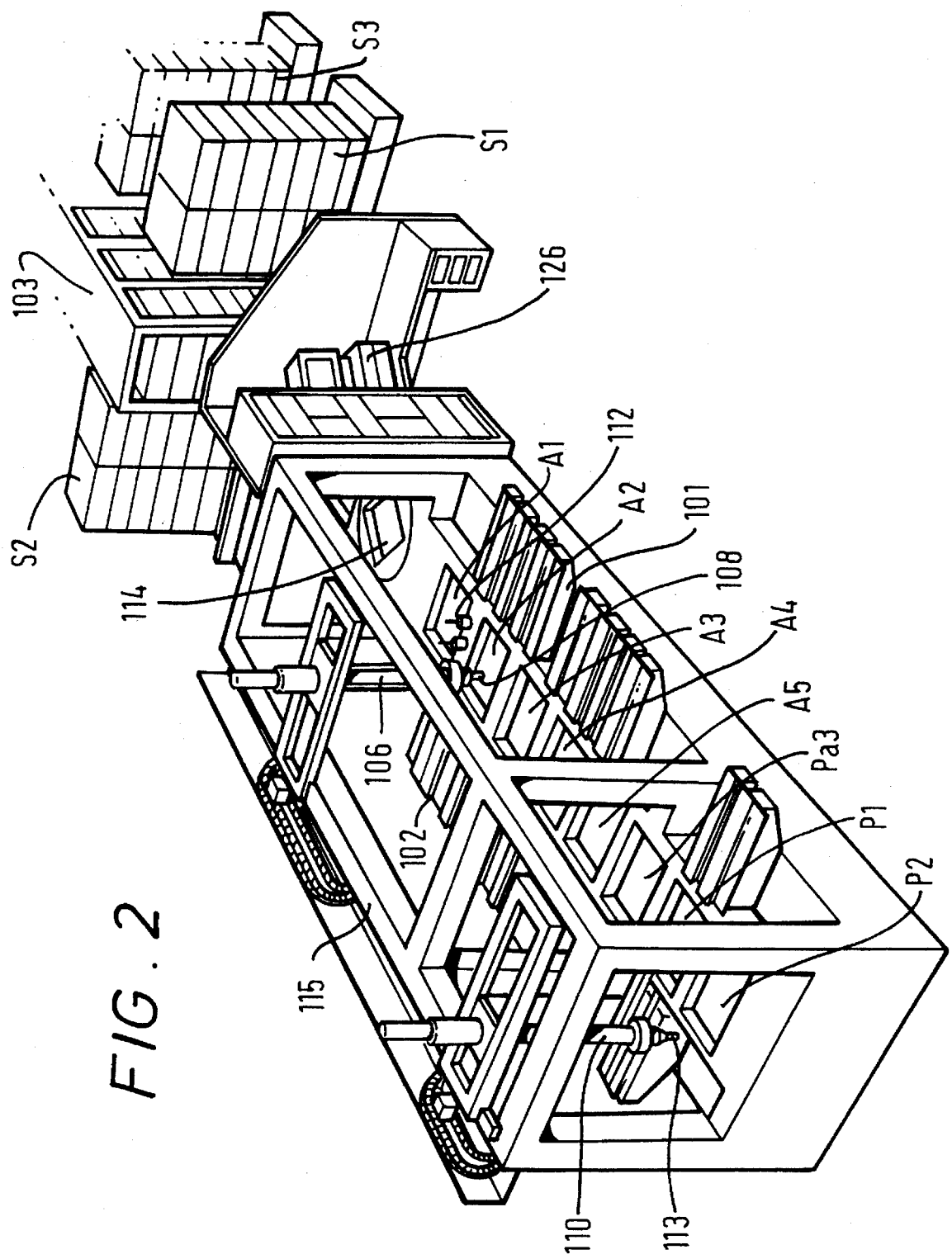
FIG. 2 shows an assembly cell in accordance with one embodiment of the invention.
Figure 3:
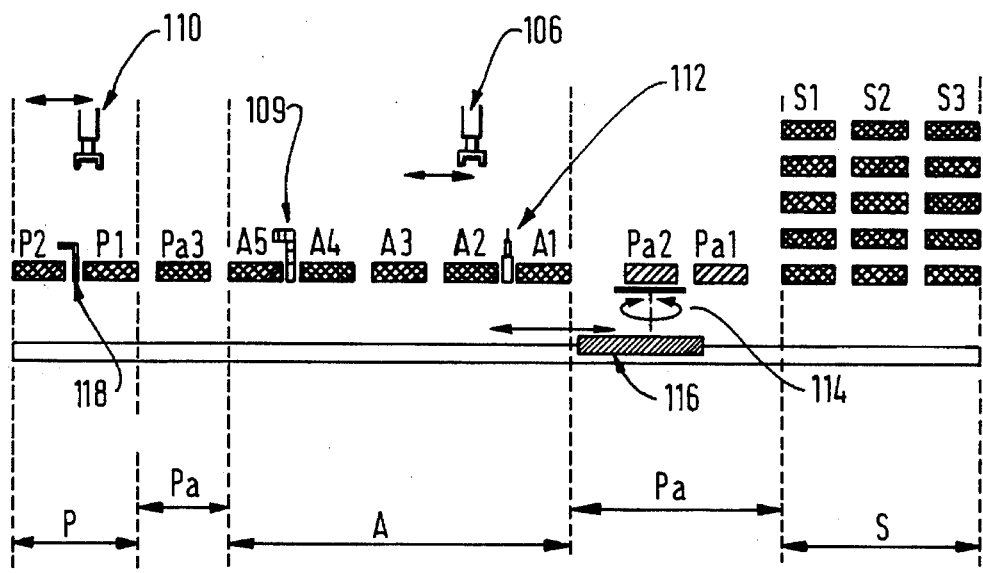
FIG. 3 is a schematic view of the same cell.

However, none of the control systems described above can be arranged to cope in a cost-effective manner with a cell as complex as that now to be described and as shown in FIGS. 2 and 3, and they do not have the power for more intelligent error recovery and adaptive learning strategies.

FIG. 2 shows an assembly cell in accordance with the present invention, omitting some parts of the cell for clarity. The cell 100 includes linear vibratory feeders 101, 102 and a transfer system 103 for input parts. It further includes a transfer system (not shown) for output parts and vertical destackers (not shown) for removing assembled items. A shuttle (not shown) is also provided for transferring parts between stations within the cell. These components comprise the material handling system, which ensures that the input component parts are provided at the right time and to the right place, and removes the products which have been assembled.

The majority of the assembly and insertion operations are performed by a 4-axis manipulator 106. In addition an active 2-axis fixture (not shown) may be provided since, as is generally described in EP-A-0266056, this distributed arrangement of the motion axes can allow efficient use of the cell as the distributed axes allow for parallel operations, and hence can reduce cycle time. The active fixture may be used for retaining and orienting the workpiece in order to allow all insertion and assembly operations to be carried out by vertical movements of the main manipulator 106. Together, the active fixture and the main manipulator 106 then give the cell the full six degrees of freedom required.

Provided on the manipulator 106 is a controlled compliance device 108, such as the end effector disclosed in EP-A-0191246, which may for example incorporate a gripper turret containing three separate sets of gripper fingers. In addition, this manipulator includes a gripper finger changing system 109 (see FIG. 3), as described in EP-A-0168945. The end effector 108 and finger changing system are required particularly to enable, and check the correctness of, a variety of insertion operations, and to allow the cell to be reconfigured for different assembly tasks. The cell may also be provided with a special gripper option allowing user-defined functionality to be embodied at the end effector. This functionality may include, for example, suction, magnetic action, or proportional control.

The majority of required assembly operations are performed by the main manipulator 106 and any active fixture, but the cell is further provided with a power operations manipulator 110. It has generally been considered that there is an advantage in having a single manipulator capable of performing all the required operations in a robotic assembly cell. However, while for assembly and insertion it is important that the manipulator be lightweight so that it can operate at high speeds, for power operations it is most important that the manipulator have a high force inducing capability, and hence a large structural mass and stiffness. Therefore, distributing these operations between two manipulators allows the two mechanisms to have improved performance characteristics appropriate to the specific tasks which they are to perform. In addition, there is the advantage that operations can be performed by the two manipulators in parallel, thereby reducing assembly cycle time.

The power operations manipulator 110 has an end effector 113. This end effectors can incorporate a range of automatically exchangeable power tools. Thus, the power operations manipulator 110 can be used for operations such as press fits, screwdriving and riveting.

The cell further includes a sensing system 112 having a set of probe sensors. The function of these sensors is to resolve inherent uncertainties which may arise due, for example, to imprecise parts feeders or manufacturing tolerances of the parts. A suitable system is described in more detail in EP-A-0194386.

The cell is constructed from modular blocks in a range of sizes, which permits a range of product sizes to be addressed, and also allows some variation in the functionality of cells in response to use and requirements. For example, a single axis adaptive fixture may be provided instead of a two axis fixture, or a different materials handling configuration may be provided. Alternatively, or additionally, a high level sensing system, using vision or tactile imaging techniques, may be incorporated in addition to the sensor system mentioned above, in order to resolve more sophisticated uncertainties beyond the scope of the probe sensors. Typically, this might be used for inspection of components for surface defects or location of key features in a previously loosely assembled mechanism.

Thus, cell modules can be added or subtracted as required depending upon the required functionality of the cell.

FIG. 3 is a schematic illustration of the cell shown in FIG. 2. The cell is divided into a stores zone S, an assembly zone A, a power operation zone P, and two parks Pa. The stores zone S is divided into three sections S1, S2 and S3, in which different parts can be stored, the assembly zone A is divided into five stations A1, A2, A3, A4 and A5, the power operations zone P has two stations P1 and P2, while the first park also has two stations Pa1 and Pa2, the latter being in the form of a turntable 114. The main manipulator 106 is movable along the overhead gantry 115 (shown in FIG. 2), so that it can operate at any of the stations A1–A5 in the assembly zone. Similarly, the power operations manipulator 110 is movable along the gantry so that it can operate at either of the stations P1 or P2 in the power operations zone. A shuttle 116 is provided for transporting parts between the various stations and between the different zones. FIG. 3 also shows the gripper finger changing system 109, and a similar device 118 provided for exchanging the tools on the power operations manipulator 110. Also shown in FIG. 3 is a sensor probe 112. The park zones Pa1–Pa3 are used if necessary for storing items between operations, while the turntable 114 is able to ensure the correct orientation of parts from the feeder.

Figure 4:
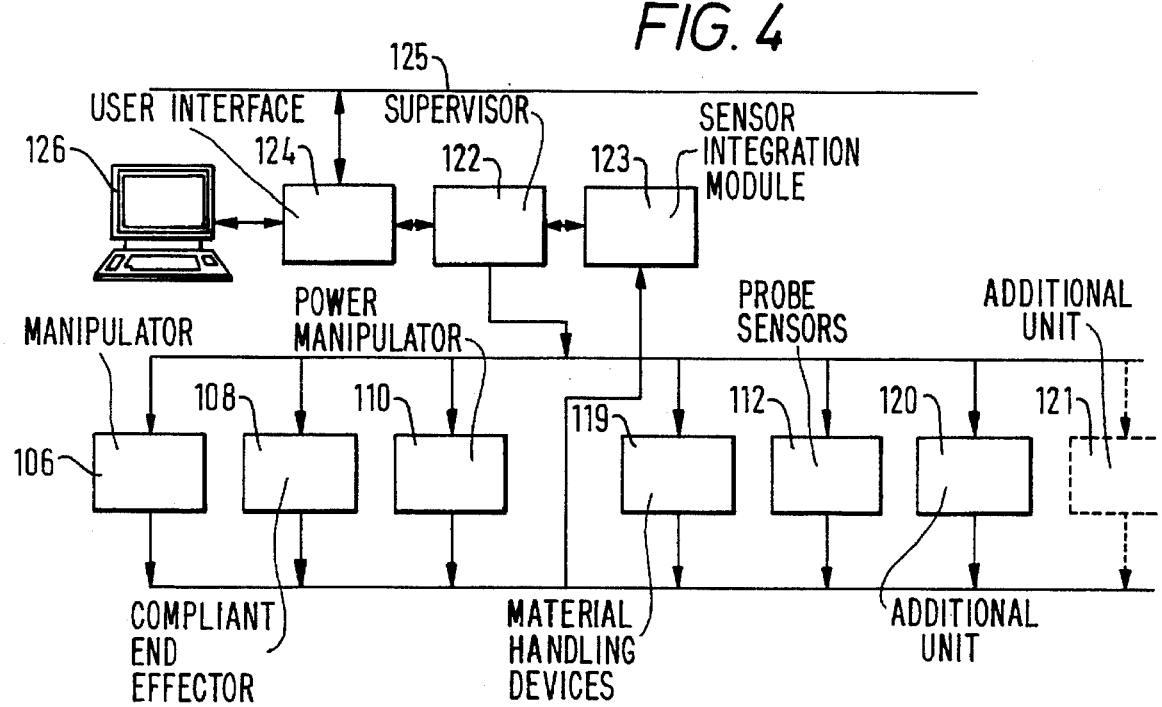
FIG. 4 is a schematic representation of the control system for the cell shown in FIGS. 2 and 3.

FIG. 4 is a schematic illustration of the control system of the cell shown in FIGS. 2 and 3. As described above the cell includes a number of discrete modules, such as a manipulator 106, a compliant end effector 108, a power manipulator 110, a set of probe sensors 112 and a plurality of material handling devices 119, including the shuttle 116 and feeders 101, 102. Additional units 120, 121 may be added as desired. Each module includes a respective unit control device. At the highest level, each unit has a similar degree of required functionality. Within each control device software instructions for an action or a set of actions are passed to the hardware for implementation. For example, in the case of the manipulator this could simply be an instruction to move one axis through a certain angle. Equally, there could be contemporaneous instructions to the manipulator and to the end effector to perform a complex insertion operation possibly requiring the use of compliance. In both cases, the status of the action will be monitored by a sensor or a number of different sensors. In the more complex cases, the output of each of the sensors must be integrated and interpreted to provide a meaningful status statement that can be acted upon. For example, this statement might indicate that the system can proceed to the next action; alternatively, if the sensor output is not what was expected, the status statement might be an instruction to try the same action again or to retrace the steps of the sequence.

In the case of the probe sensors, the module includes a unit control device incorporating a processing unit receiving signals from the sensors. The probe sensors are not controlled by the processing unit; that processing unit is provided for calculating positions and/or orientations of objects which touch the probe sensors on the basis of the signals received from those sensors, in conjunction with the manipulator co-ordinate position at the instant of signal generation.

The system is provided with a supervisor 122. Integral with the supervisor is a sensor integration module 123, which is operatively connected to the sensor systems of the unit control devices, and to the processing unit of the probe sensor module, to receive therefrom signals corresponding to the calculated positions and/or orientations of objects which touch the sensors. The supervisor is also connected to a user interface 124. By means of a terminal 126, which is located at the cell, the interface 124 allows effective communication from the user to the system, for example for programming and scheduling, and from the cell to the user, for example for cell status reports and fault diagnostics. The user interface 124 is connected to a local area network 125, which may itself be connected to other factory management systems.

Thus, the control loop has the ability to receive instructions from a higher level in the control system, and to pass status reports back up to higher levels. At no time do the individual modules communicate with each other.

Moreover, additional modules, such as a high level imaging system, with their own sensors and control units, can easily be added to the system. Each unit can then be provided with the correct amount of intelligence required for its own functionality, which will include the functions normally associated with control by a PLC. Because it is required that each unit be capable of carrying out processing operations in parallel, each unit control device incorporates a transputer, and the processing capability of the transputer for a given unit control device will depend upon the intelligence which is required by that unit.

In use of the cell, assembly fixtures are stored at the supply zone S, and are brought into the working zones by the shuttle 116, which incorporates a lifting mechanism to raise the fixture to the working height, where it is retained. It is intended that a number of assemblies will be carried out on one fixture: the actual number will depend upon the physical size of the product. The machine operation will start with the assembly fixture being positioned at one of the stations A1–A5 in the main assembly zone: components will be placed into the fixture either from vibratory feeders 101, 102 or from pallets of components brought into the zone by the shuttle 116 and positioned in one of the adjacent stations. For example, with the assembly fixture positioned in location A2, the additional components will be located at A1 or A3 (or both). As further, different, components are required, empty component pallets are replaced by the shuttle. This process will continue until operations requiring the use of power operations manipulator 110 are required. The fixture will then be moved by the shuttle 116 to power operations zone P1, and a new fixture will be brought into the main zone at A2. Both manipulators will then work in parallel. During operations by the main manipulator 106 and/or by the power operations manipulator, the end effector being used may be exchanged to allow different functions to be carried out. On finishing the power operations activity, the first fixture is then moved to location A4 in the main zone for completion, whilst the second is moved to P1 for power operations. A third fixture is then brought into A2 ready for when the main manipulator 106 has finished at A4. It is generally considered that three fixtures are sufficient: two are being worked on, whilst the third is being positioned in anticipation. The scheduling of this process is automatically generated by the machine supervisor 122. The user needs only to specify the order of inclusion of components into the assembly and the zones in which particular operations are to take place. A simple simulation process run on the supervisor, and displayed on the screen of the terminal 126, allows user validation of the sequence, and generates cycle times for the assembly process.

Although the invention has been described above with reference to an assembly cell, the control structure is equally suitable for use in a number of different material processing systems. Such systems include, for example:

- inspection and testing systems;
- construction industry systems;
- medical applications;
- adhesive and sealant dispensing; and
- various textile applications involving the control of stitching and sewing processes amongst others.

We claim:

1. A material processing cell comprising:

a system controller;

first means for retaining a workpiece at a fixed location in a first material processing station in a first material processing zone;

second means for retaining a workpiece at a fixed location in a second material processing station in the first material processing zone;

a first controlled unit having an exchangeable end effector for carrying out a first type of material processing function, the first controlled unit being moveable between said first and second material processing stations so that it can carry out the first type of material processing function on a workpiece at either one of the first and second material processing stations in said first material processing zone;

third means for retaining a workpiece at a fixed location in a material processing station in a second material processing zone;

a second controlled unit having an exchangeable end effector for carrying out a second type of material processing function, different from the first type of material processing function, on a workpiece at the said material processing station in said second material processing zone;

means for transferring objects to be processed between the first and second material processing zones; and a sensor system for supplying to the system controller position data concerning at least one workpiece;

each of the first and second controlled units including an individually associated dedicated unit control device comprising a respective processor, each of said dedicated unit control devices being in communication with the system controller in order to receive command signals, so that the first and second controlled units may be enabled to carry out their respective material processing functions simultaneously.

2. A material processing cell as claimed in claim 1, wherein the first controlled unit is a main manipulator, and the second control unit is a power operations manipulator for carrying out material processing functions requiring the application of high forces.

3. A material processing cell as claimed in claim 1, further comprising a transportation system for transferring workpieces backwardly and forwardly between the first and second material processing zones.

4. A material processing cell comprising:

a system controller;

a first manipulator having an exchangeable end effector for carrying out a first type of assembly operation in a first material processing zone, and said first manipulator including a dedicated unit control device comprising a processor;

a second manipulator having an exchangeable end effector for carrying out a second type of assembly operation in a second material processing zone, and including a dedicated unit control device comprising a processor;

first means for retaining a workpiece at a fixed location in a first material processing station in the first material processing zone;

second means for retaining a workpiece at a fixed location in a second material processing station in the first material processing zone;

third means for retaining a workpiece at a fixed location in a material processing station in the second material processing zone;

a sensor system for supplying to the system controller position data concerning at least one object to be processed; and means for connecting the respective dedicated unit control devices to the system controller so that the unit control devices can receive command signals, and such that the first and second manipulators may be enabled to carry out their respective material processing functions simultaneously;

the means for connecting the respective dedicated unit control devices to the system controller comprising means for allowing a connection to the cell of at least one additional module, the at least one additional module having its own respective unit control device, so that the at least one additional module can receive command signals from the system controller.

5. A material processing cell comprising:

a first manipulator having an exchangeable end effector for carrying out a first type of assembly operation in a first material processing zone;

a second manipulator having an exchangeable end effector for carrying out a second type of assembly operation in a second material processing zone;

first means for retaining a workpiece at a fixed location in a first material processing station in the first material processing zone;

second means for retaining a workpiece at a fixed location in a second material processing station in the first material processing zone;

third means for retaining a workpiece at a fixed location in a material processing station in the second material processing zone;

a sensor system for supplying to the system controller a sensor output in the form of position data concerning at least one object to be processed;

wherein each of the first and second manipulators includes a respective dedicated unit control device comprising a respective processor, each dedicated unit control devices being in communication with the system controller in order to receive command signals, such that the first and second manipulators may be enabled to carry out respective sequences of steps in order to perform their respective assembly operations simultaneously; and wherein the sensor output from the sensor system includes an instruction to alter a programmed sequence of steps if the sensor output is not what was expected.

6. A material processing cell comprising:

a system controller;

first means for retaining a workpiece at a fixed location in a first material processing station in a first material processing zone;

second means for retaining a workpiece at a fixed location in a second material processing station in the first material processing zone;

a first controlled unit having an exchangeable end effector for carrying out a first type of material processing function, the first controlled unit being moveable between said first and second material processing stations so that it can carry out a first type material processing function on a workpiece at either one of the first and second material processing stations in said first material processing zone;

third means for retaining a workpiece at a fixed location in a material processing station in a second material processing zone;

a second controlled unit having an exchangeable end effector for carrying out a second type of material processing function which is different from the first type of material processing function, on a workpiece at the said material processing station in said second material processing zone; and means for transferring objects to be processed from the first material processing zone to the second material processing zone when said second type of material processing function is to be performed, and for transferring objects to be processed from the second material processing zone to the first material processing zone when said first type of material processing function is to be performed.

* * * * *